United States Patent
Chen et al.

(10) Patent No.: US 11,453,313 B2
(45) Date of Patent: Sep. 27, 2022

(54) MEMORY MODULE AND SEAT MOUNTING STRUCTURE WITH EASY ENTRY MODULE

(71) Applicant: KEIPER SEATING MECHANISMS CO., LTD., Shanghai (CN)

(72) Inventors: Tong Chen, Shanghai (CN); Bin Huang, Shanghai (CN); Ke Liu, Shanghai (CN); Junjie Wang, Shanghai (CN); Dong Liu, Shanghai (CN)

(73) Assignee: KEIPER SEATING MECHANISMS CO., LTD.

( * ) Notice: Subject to any disclaimer, the term of this patent is extended or adjusted under 35 U.S.C. 154(b) by 0 days.

(21) Appl. No.: 17/420,428

(22) PCT Filed: Dec. 30, 2019

(86) PCT No.: PCT/CN2019/129937
§ 371 (c)(1),
(2) Date: Jul. 2, 2021

(87) PCT Pub. No.: WO2020/140870
PCT Pub. Date: Jul. 9, 2020

(65) Prior Publication Data
US 2022/0118887 A1     Apr. 21, 2022

(30) Foreign Application Priority Data

Jan. 2, 2019   (CN) .......................... 201910000531.3

(51) Int. Cl.
*B60N 2/07*   (2006.01)
*B60N 2/08*   (2006.01)
*B60N 2/06*   (2006.01)

(52) U.S. Cl.
CPC ............. *B60N 2/0727* (2013.01); *B60N 2/08* (2013.01); *B60N 2/06* (2013.01); *B60N 2/07* (2013.01)

(58) Field of Classification Search
CPC ........ B60N 2/0727; B60N 2/072; B60N 2/07; B60N 2/06; B60N 2/08; B60N 2/0862; B60N 2/0843
(Continued)

(56) References Cited

U.S. PATENT DOCUMENTS 6,098,946 A     8/2000  Sechet et al.

FOREIGN PATENT DOCUMENTS

CN    101157344 A    4/2008
CN    101633330 A    1/2010
(Continued)

OTHER PUBLICATIONS

International Search Report dated Apr. 2, 2020, 4 pages.

*Primary Examiner* — Nkeisha Smith
(74) *Attorney, Agent, or Firm* — Dickinson Wright PLLC

(57) ABSTRACT

A memory module includes a pressure tongue rotatably mounted on a fixed block through a reset spring providing a first driving force for rotation of the pressure tongue. A rotating block is rotatably mounted on a slider through a torsion spring providing a second driving force for rotation of the rotating block, and the slider is slidably mounted on a guide rail. When the rotating block projects forwards under the action of the second driving force, a locking block is inserted into a locking hole, and an upper retaining surface is separated from a first lower retaining point. When the pressure tongue presses the rotating block downwards under the action of the first driving force to overcome the second driving force to force the rotating block to raise backwards, the locking block is separated from the locking hole, and the upper retaining surface is contact with the first lower retaining point.

12 Claims, 3 Drawing Sheets

(58) Field of Classification Search
USPC .................................................. 248/428, 429
See application file for complete search history.

(56)     References Cited

FOREIGN PATENT DOCUMENTS

| CN | 102126449 A | 7/2011 |
| CN | 102198808 A | 9/2011 |
| CN | 109435787 A | 3/2019 |

MEMORY MODULE AND SEAT MOUNTING STRUCTURE WITH EASY ENTRY MODULE

CROSS-REFERENCE TO RELATED APPLICATIONS

The present application is a national phase application of International Application No. PCT/CN2019/129937, filed on Dec. 30, 2019, which claims priority to Chinese patent application No. 201910000531.3, filed on Jan. 2, 2019, entitled "MEMORY MODULE AND SEAT MOUNTING STRUCTURE WITH EASY ENTRY MODULE," the disclosures of which are hereby incorporated by reference in their entireties.

FIELD OF THE INVENTION

The present invention relates to an automotive seat, and more specifically to a memory module and a seat mounting structure with an easy-entry module.

BACKGROUND OF THE INVENTION

With the two-child policy, 5-seater sedans can no longer meet the needs of families with larger members. Therefore, in recent years, the market of 7-seater SUVs and MPVs has increased year by year. 7-seater has been favored by more and more families, and gradually becomes the mainstream model in the automotive market. An easy-entry (EZE) module aims to provide the enough access room for passengers of each row, especially for the passenger straight to his third-row seat passing the second-row seat.

The seat mounting structure with the easy-entry module usually includes a lower sliding rail and an upper sliding rail. The lower sliding rail is stationary relative to the floor or frame of the car and the upper sliding rail is stationary relative to the seat (such as the second-row seat). The upper sliding rail is connected to the lower sliding rail for allowing the upper sliding rail movable back and forth relative to the lower sliding rail. When the seat on the upper sliding rail is moved forward, a more spacious access room for passenger to the rear seat is provided. In addition, the seat mounting structure with the easy-entry module also includes a rail locking mechanism for restricting the relative movement between the lower sliding rail and the upper sliding rail, so as to lock the upper sliding rail (i.e., the seat) after the passenger accesses to the rear seat.

It is known that the seat mounting structure with the easy-entry module can also include a memory module to allow the seat to move forward from a selected point (such as a comfortable position of the second-row passenger), and then allow the seat to move backward before the selected point. Such memory module is often arranged outside of the sliding rails (i.e., the lower sliding rail and the upper sliding rail), which not only takes up a lot of space and makes it inconvenient to arrange, but also expensive. Further, additional fastening structure is needed on the seat frame. Compared with such external memory module, the memory module arranged inside the sliding rails has significant advantages. For example, CN102126449 and CN102198808B disclose memory modules, which do not need to take up the space outside the sliding rails. However, these known memory modules have numerous parts and complex mechanisms, for example complex parts such as ratchets, which take up a large space inside the sliding rails, easily interfere with the rail locking mechanism and are difficult to apply to different types of sliding rails. Moreover, many parts of these known memory modules need to be installed before the sliding rails are paired, resulting in high installation costs. In addition, more slots on the sliding rails are needed for these known memory modules, and thus the overall rigidity of the sliding rails is reduced and their applications are greatly restricted.

SUMMARY OF THE INVENTION

In order to solve the problems of the complex structure and the large space occupied of the built-in module in the prior art, the present invention aims to provide a memory module and a seat mounting structure with an easy-to-enter module.

The present invention provides a memory module, comprising: an upper module including a fixed block, a pressure tongue and a reset spring, wherein the pressure tongue is rotatably mounted on the fixed block by the reset spring, wherein the reset spring provides a first driving force for the rotation of the pressure tongue, wherein the fixed block has a downwardly extending upper retaining point, and wherein the pressure tongue has an upper retaining surface formed by the front surface; a lower module engaged with the upper module and including a guide rail, a slider, a rotating block and a torsion spring, wherein the rotating block is rotatably mounted on the slider by the torsion spring, wherein the torsion spring provides a second driving force for the rotation of the rotating block, wherein the slider is slidably mounted on the guide rail, wherein the guide rail has locking holes, wherein the rotating block has a locking block, wherein the slider has an upwardly extending first lower retaining point at its front end, wherein the rotating block has an upwardly extending second lower retaining point at its rear end for engaging with the upper retaining point; when the front end of the rotating block is raised under the action of the second driving force, the locking block is inserted into the locking hole, and the upper retaining surface is separated from the first lower retaining point; when the rear end of the rotating block is raised since the rotating block is pressed by the pressure tongue under the action of the first driving force overcoming the second driving force, the locking block is separated from the locking hole, and the upper retaining surface is engaged with the first lower retaining point.

The fixed block comprises a top plate portion and a bottom plate portion, wherein the bottom plate portion starts from the lower surface of the top plate portion and extends downward in an arc shape and then extends parallel to the top plate portion to form a fixed arcuate section and a straight section; wherein the rear end of the pressure tongue extends upward in an arc shape to form a tongue arcuate section; wherein the reset spring includes a first reed and a second reed; wherein the second reed starts from the rear end of the first reed and extends upward in an arc shape and then slopes upward to form a reed arcuate section and an inclined section; wherein the reed arcuate section is received in the tongue arcuate section, and the tongue arcuate section is received in the fixed arcuate section; wherein the inclined section is engaged with the top plate portion; and wherein the first reed provides the first driving force to the straight section of the pressure tongue.

The fixed block further comprises a connecting rib, which extends perpendicular to the top plate portion and the bottom plate portion between the top plate portion and the bottom plate portion; wherein the pressure tongue includes side sections spaced apart by a tongue notch; wherein the reset spring includes side sections spaced apart by a reed notch;

and wherein the connecting rib is inserted into and engaged with the tongue notch and the reed notch.

The inclined section has a protrusion, wherein the top plate portion has a recess, and wherein the protrusion extends into and engaged with the recess.

The pressure tongue comprises a first tongue portion, an inclined portion and a second tongue portion, wherein the inclined portion is between the first tongue portion and the second tongue portion parallel to each other and connects the first tongue portion to the second tongue portion.

The upper module further comprises a pull tab mounted on the pressure tongue, wherein the pull tab has a curved section, wherein the inclined portion has a through hole, and wherein the curved section is inserted into and engaged with the through hole.

The guide rail comprises a bottom wall and two side walls extending perpendicular to the bottom wall; wherein the slider is a rectangular frame structure and includes two longitudinal beams parallel to each other and two transverse beams perpendicular to the longitudinal beams and connecting the longitudinal beams; wherein half spheres are raised from both the bottom surface and the outer surface of the longitudinal beams; and wherein the half spheres is slidable on and engaged with the bottom wall and the side wall of the guide rail.

The lower module further comprises a rotating shaft fixedly connected to the slider, wherein the torsion spring around the rotating shaft includes a first torsion arm, a second torsion arm and a connecting arm, wherein the connecting arm is disposed between the first torsion arm and the second torsion arm and connects the first torsion arm to the parallel second torsion arm; wherein the connecting arm is pressed on the upper surface of the rotating block, and wherein the free ends of the first torsion arm and the second torsion arm away from the connecting arm are pressed on the upper surface of the slider to provide the second driving force to the rotating block.

The present invention provides a seat mounting structure with an easy-entry module, wherein the seat mounting structure includes above memory module.

The seat mounting structure also includes a lower sliding rail, an upper sliding rail and the easy-entry module, wherein the upper module is connected to and inside the upper sliding rail, wherein the lower module is connected to and inside the lower sliding rail, wherein the upper sliding rail is connected to the lower sliding rail for allowing the upper sliding rail movable back and forth relative to the lower sliding rail, and wherein the easy-entry module is respectively connected to the upper module and the upper sliding rail.

The guide rail of the lower module is connected to the lower sliding rail at two ends by a first blind rivet and a second blind rivet.

The memory module and the seat mounting structure according to of the present invention provide the locking and unlocking of the slider on the guide rail through the cooperation of the rotatable pressure tongue and the rotating block. The structure is simple, without involving complex parts such as ratchets. The module cost is reduced with fewer components. The occupy space in sliding rails is small and the interference with the rail locking mechanism is avoided, for enhancing the scope of use of the module. In particular, locking holes are disposed on the guide rail, and slots opened on the sliding rail are omitted, thus the weakening of the rigidity of the sliding rail is avoided. In fact, the rigidity of the sliding rail can be strengthened by the guide rail in the sliding rail, and the front and rear stroke stops can be formed by the fasteners of the guide rail and the sliding rail. In addition, the memory module of the seat mounting structure of the present invention is driven by the easy-entry module, in order to realize the coordinated movement of the easy-entry module and the memory module. Moreover, for the seat mounting structure according to the present invention, the upper and lower modules of the memory module can be separately installed on the upper and lower sliding rails after the upper and lower sliding rails are paired, which does not involve a lot of installation work before the sliding rails are paired, and thus the complexity of installation is reduced.

DESCRIPTION OF THE ENABLING EMBODIMENT

The preferred embodiments of the present invention will be described in detail below in conjunction with the drawings.

Figure 1:
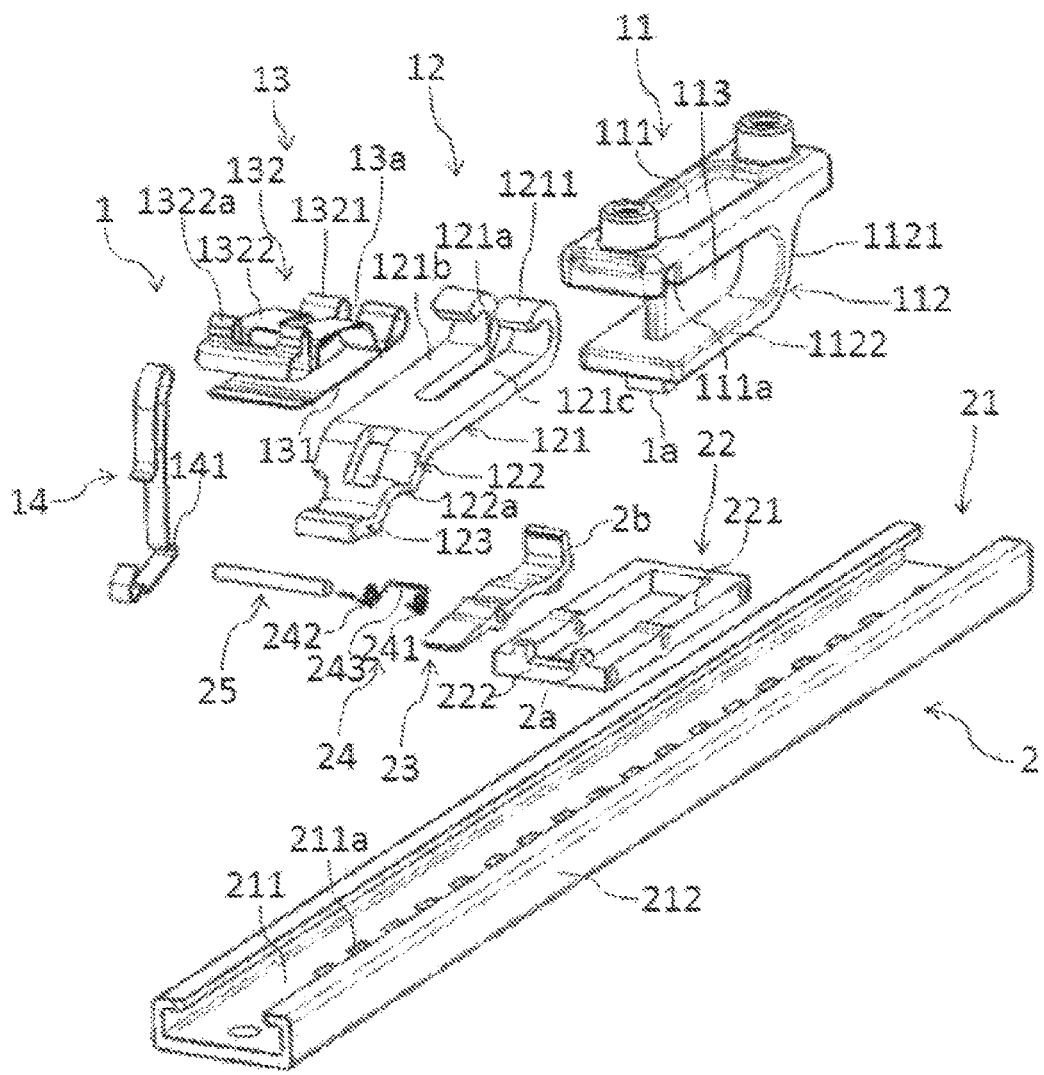
FIG. 1 is an exploded view of a memory module according to a preferred embodiment of the present invention.

As shown in FIG. 1, a memory module according to a preferred embodiment of the present invention includes an upper module 1 and a lower module 2 that cooperate with each other. In a coupling state, the upper module 1 and the lower module 2 are linked. In a decoupling state, the upper module 1 moves independently relative to the stationary lower module 2.

The upper module 1 includes a fixed block 11, a pressure tongue 12, a reset spring 13 and a pull tab 14, wherein the pressure tongue 12 is mounted on the fixed block 11 by the reset spring 13, and the pull tab 14 is mounted on the pressure tongue 12.

Specifically, the fixed block 11 is a splint structure, and includes a top plate portion 111, a bottom plate portion 112 and a connecting rib 113. The bottom plate portion 112 starts from the lower surface of the top plate portion 111 and extends downward in an arc shape and then extends parallel to the top plate portion 111, and thus a fixed arcuate section 1121 and a straight section 1122 are formed (see FIG. 2). The connecting rib 113 extends perpendicular to the top plate portion 111 and the bottom plate portion 112 between the top plate portion 111 and the bottom plate portion 112. In addition, an upper retaining point 1a extends downwardly from the lower surface of the straight section 1122, the function of which will be explained when the working mechanism of the memory module is described below.

The pressure tongue 12 is a sheet structure, and includes a first tongue portion 121, an inclined portion 122 and a second tongue portion 123, wherein the inclined portion 122 is between the first tongue portion 121 and the second tongue portion 123 parallel to each other and connects the first tongue portion 121 to the second tongue portion 123

Figure 2:
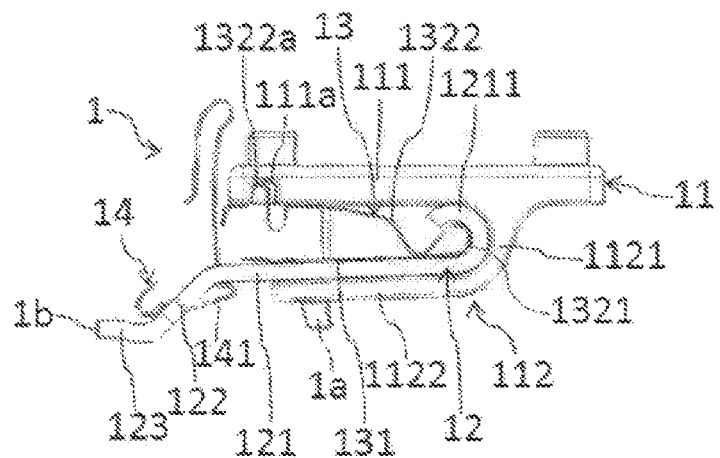
FIG. 2 is a cross-sectional view of the upper module of FIG. 1.

(see FIG. 2). An end of the first tongue portion 121 away from the second tongue portion 123 includes a first side section 121b and a second side section 121c spaced apart by a tongue notch 121a. The free ends of the first side section 121b and the second side section 121c respectively extend upward in an arc shape to form a tongue arcuate section 1211. In addition, a front surface of the second tongue portion 123 is formed as an upper retaining surface 1b, the function of which will be explained when the working mechanism of the memory module is described below (see FIG. 2). In the installation state, the tongue notch 121a is engaged with the connecting rib 113, and the tongue arcuate section 1211 is engaged with the fixed arcuate section 1121 (see FIG. 2), so that the lateral movement of the pressure tongue 12 is restricted and only the rotation movement around the center of the arc is allowed.

The reset spring 13 is a clip structure, and includes a first reed 131 and a second reed 132, wherein the second reed 132 starts from one end of the first reed 131 and extends upward in an arc shape and then slopes upward to form a reed arcuate section 1321 and an inclined section 1322 (see FIG. 2). Similar to the pressure tongue 12, the end of the reset spring 13 away from the free end includes two side sections spaced apart by a reed notch 13a. In the installation state, the reed notch 13a is engaged with the connecting rib 113, and the reed arcuate section 1321 is engaged with the tongue arcuate section 1211 (see FIG. 2). In addition, as shown in FIG. 2, the inclined section 1322 has a protrusion 1322a adjacent to the free end; the top plate portion 111 has a recess 111a adjacent to the free end; and the protrusion 1322a is engaged with the recess 111a to relatively fix the end of the reset spring 13. Due to the preload force of the first reed 131 and the second reed 132 of the reset spring 13, a downward prestressing force is always exerted to the first tongue portion 121 by the first reed 131.

Returning to FIG. 1, the pressure tongue 12 has a through hole 122a in the middle of the inclined portion 122, and the pull tab 14 passing the through hole 122a is connected to the pressure tongue 12 by its curved section 141.

The installation of the upper module 1 is easy, including: laterally inserting the arcuate section 1321 of the reset spring 13 into the tongue arcuate section 1211 of the pressure tongue 12; and then inserting the connecting rib 113 of the fixed block 11 into the tongue notch 121a of the pressure tongue 12 and the reed notch 13a of the reset spring 13 until the protrusion 1322a of the reset spring 13 is inserted into the recess 111a of the fixed block 11; and then snapping the curved section 141 of the pull tab 14 into the through hole 122a of the pressure tongue 12 from above.

The lower module 2 includes a guide rail 21, a slider 22, a rotating block 23, a torsion spring 24 and a rotating shaft 25. The rotating block 23 is mounted on the slider 22 via the torsion spring 24 and the rotating shaft 25, and the slider 22 is mounted on the guide rail 21.

Specifically, the guide rail 21 has a U-shaped structure, and includes a bottom wall 211 and two side walls 212 extending perpendicular to the bottom wall 211. The bottom wall 211 has a plurality of locking holes 211a.

The slider 22 is a rectangular frame structure, and includes two longitudinal beams 221 parallel to each other and two transverse beams 222 perpendicular to the longitudinal beams 221 and connecting the longitudinal beams 221. A first lower retaining point 2a extends upwardly from the top surface of the front transverse beam 222, the function of which will be explained when the working mechanism of the memory module is described below. Half spheres are raised from both the bottom surface and the outer surface of the longitudinal beams 221. In the installation state, the slider 22 is guided in the guide rail 21 in a free slide manner by the raised half spheres.

Figure 3:
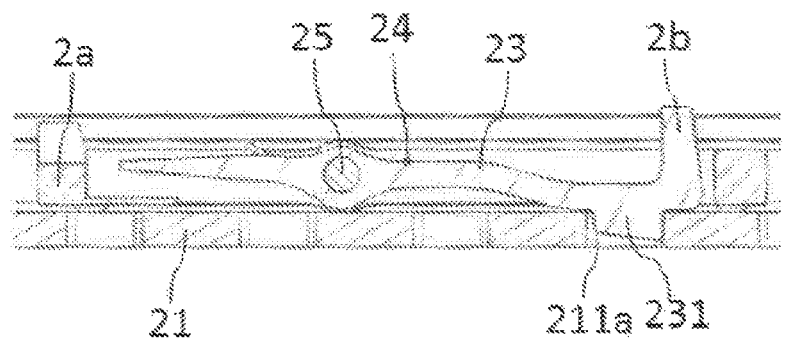
FIG. 3 is a partial cross-sectional view of the lower module of FIG. 1.

The rotating block 23 is a plate-like structure, and a second lower retaining point 2b extends upwardly from its rear end, the function of which will be explained when the working mechanism of the memory module is described below. In addition, a locking block 231 extends downwardly from the lower surface of the rotating block 23 adjacent to the second lower retaining point 2b for engaging with the locking holes 211a of the guide rail 21, as shown in FIG. 3.

Returning to FIG. 1, the torsion spring 24 includes a first torsion arm 241, a second torsion arm 242 and a connecting arm 243, wherein the connecting arm 243 is disposed between the first torsion arm 241 and the second torsion arm 242 and connects the first torsion arm 241 to the second torsion arm 242. In the installation state, the rotating shaft 25 is fixedly connected to the slider 22; the rotating block 23 and the torsion spring 24 are disposed around the rotating shaft 25 in the slider 22 and can rotate around the rotating shaft 25; the connecting arm 243 of the torsion spring 24 is pressed on the upper surface of the rotating block 23, and the free ends of the first torsion arm 241 and the second torsion arm 242 away from the connecting arm 243 are pressed on the upper surface of the longitudinal beams 221, so that a force is always applied to the rotating block 23 at its rear end by the torsion spring 24 to press down the locking block 231, i.e., to raise the front end of the rotating block 23. In the present embodiment, an interference fit is provided between the rotating shaft 25 and the longitudinal beams 221, in order to ensure that there is no relative rotation between the rotating shaft 25 and the slider 22. In the present embodiment, a clearance fit is provided between the rotating shaft 25 and the rotating block 23, in order to ensure that the rotating block 23 can rotate around the rotating shaft 25.

With reference to FIG. 1, the installation of the lower module 2 is also easy, including: putting the rotating block 23 within the frame structure of the slider 22; putting the connecting arm 243 of the torsion spring 24 on the rotating block 23; inserting the rotating shaft 25 through the torsion arms 241, 242 of the torsion spring 24, the rotating block 23 and the slider 22; and sliding the assembly into the guide rail 21 from the front or rear end.

The working mechanism of the memory module will be described in detail below with reference to FIG. 4.

In an initial state, a downward prestressing force is exerted to the first tongue portion 121 of the pressure tongue 12 by the first reed 131 of the reset spring 13, allowing the pressure tongue 12 to rotate clockwise around the center of the arc, and to press down the front end and raise the rear end of the rotating block 23. At this time, the upper retaining surface 1b formed by the front surface of the pressure tongue 12 is engaged with the upwardly extending first lower retaining point 2a of the slider 22. When the upper module 1 is forced to move forward, the lower module 2 is moved forward accordingly. In addition, at this time, the downwardly extending upper retaining point 1a of the fixed block 11 is engaged with the upwardly extending second lower retaining point 2b of the rotating block 23 at its rear end. When the upper module 1 is forced to move backward, the lower module 2 is moved backward accordingly. That is to say, the upper module 1 and the lower module 2 are linked.

An external force F is acted on the pull tab 14 to overcome the preload of the reset spring 13, so that the front end of the pressure tongue 12 is raised to move away from the rotating block 23. The front end of the rotating block 23 is raised under the action of the torsion spring 24 (See FIG. 1) after the pressure tongue 12 leaves, and the locking block 231 at its rear end of the rotating block 23 is inserted into the locking hole 211a of the guide rail 21 to fix the lower module 2 at the selected position, which is the memory position.

Since the upwardly warped pressure tongue 12 is free from the restriction of the first lower retaining point 2a, the forward movement of the upper module 1 is completely independent from the lower module 2.

Although the front end of the rotating block 23 is raised under the action of the torsion spring 24, the upwardly extending second lower retaining point 2b at its rear end is also engaged with the downwardly extending upper retaining point 1a of the fixed block 11. The backward movement of the upper module 1 is stopped by the second lower retaining point 2b at the memory position since the lower module 2 is fixed at the memory position. After that, the external force F is released, and the upper module 1 and the lower module 2 are restored to the initial state under the preload of the reset spring 13.

Figure 5:
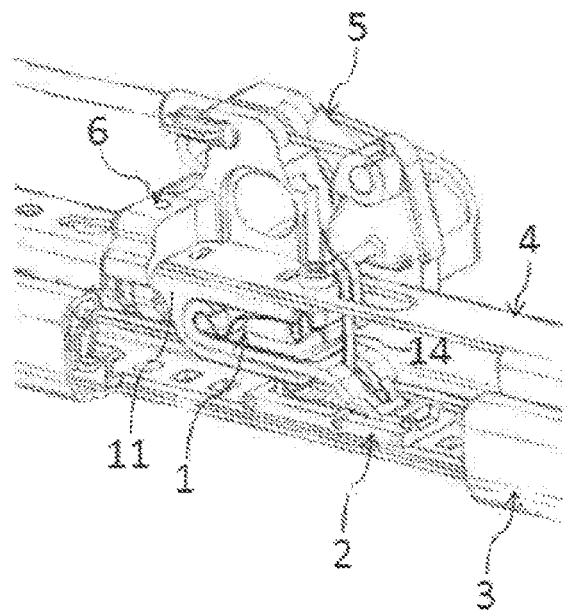
FIG. 5 is a schematic diagram of a seat mounting structure with an easy-entry module according to a preferred embodiment of the present invention including the memory module of FIG. 1.
Figure 6:
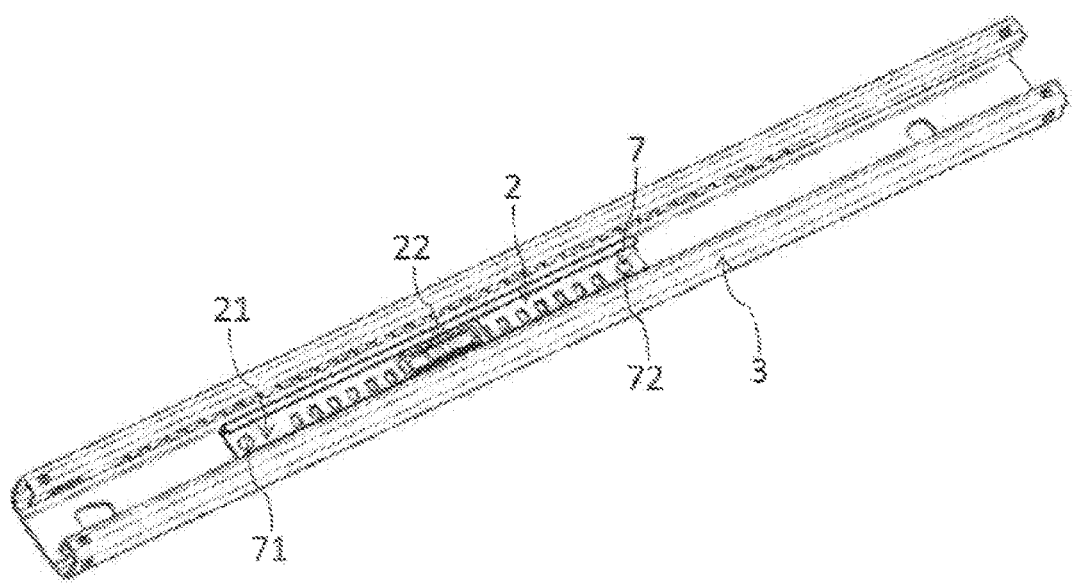
FIG. 6 is an installation diagram of the lower module and the lower sliding rail of FIG. 5.

As shown in FIG. 5, a seat mounting structure with an easy-entry module according to a preferred embodiment of the present invention includes an upper module 1, a lower module 2, a lower sliding rail 3, an upper sliding rail 4 and an easy-entry module 5, wherein the upper module 1 is connected to the upper sliding rail 4 which is stationary relative to the seat, wherein the lower module 2 is connected to the lower sliding rail 3 which is stationary relative to the floor or frame of the car, wherein the upper sliding rail 4 is connected to the lower sliding rail 3 for allowing the upper sliding rail 4 movable back and forth relative to the lower sliding rail 3, and wherein the easy-entry module 5 is respectively connected to the upper module 1 and the upper sliding rail 4. Specifically, the easy-entry module 5 and the upper module 1 are respectively fixed on opposite sides of the upper sliding rail 4 by a first fastener 6, that is to say, the upper module 1 is mounted inside the upper sliding rail 4, and the easy-entry module 5 is mounted outside the upper sliding rail 4. For example, a long bolt is disposed through the easy-entry module 5, the upper sliding rail 4 and the fixed block 11 of the upper module 1. In addition, the easy-entry module 5 is connected to the pull tab 14 of the upper module 1 to provide the external force F to the pull tab 14. FIG. 6 is a schematic diagram showing the lower module 2 mounted inside the lower sliding rail 3 through a second fastener 7. The second fastener 7 includes a first blind rivet 71 and a second blind rivet 72, by which the guide rail 21 of the lower module 2 is connected to the lower sliding rail 3 at two ends. In addition, the first blind rivet 71 and the second blind rivet 72 are formed as the front and rear stroke stops of the slider 22 of the lower module 2.

The installation of the seat mounting structure is also easy, including: fastening the easy-entry module 5 and the upper module 1 on the upper sliding rail 4 by the first fastener 6; fastening the lower module 2 on the lower sliding rail 3 by the second fastener 7; and pairing the upper sliding rail 4 with the lower sliding rail 3.

The working mechanism of the seat mounting structure with easy-entry modules will be described in detail below. In the initial state, the upper sliding rail 4 is slidable on the lower sliding rail 3, wherein the upper module 1 and the lower module 2 are linked. The upper sliding rail 4 is movable back and forth when force in forward or backward direction is applied to the seat. Within the stroke range defined by the first blind rivet 71 and the second blind rivet 72 (see FIG. 6), the seat can be adjusted to a comfortable position (the memory position) and the upper sliding rail 4 can be locked by a rail locking mechanism (not shown).

Figure 4:
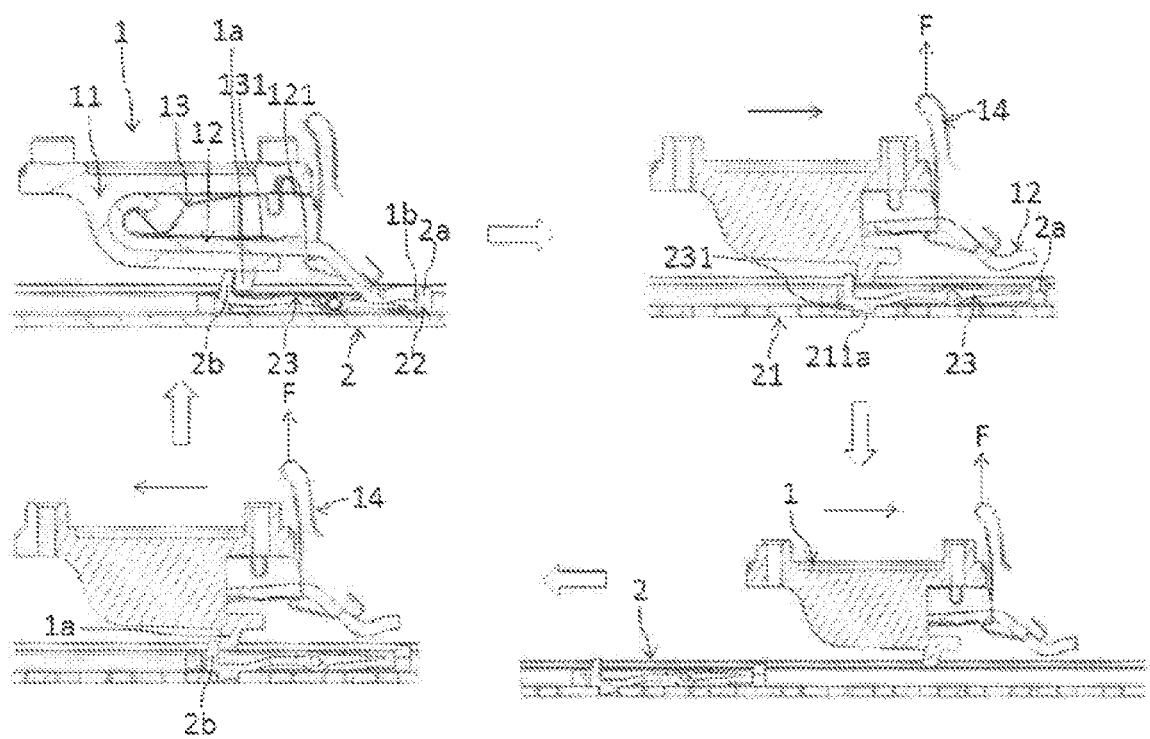
FIG. 4 shows the working mechanism of the memory module of FIG. 1.

When the passenger wants to access to the rear seat, the easy-entry module 5 is started to unlock the rail locking mechanism and apply an external force F to the pull tab 14 (see FIG. 4). The lower module 2 is stationary at the memory position. When the seat is pushed forward, only the upper module 1 is movable forward to the restricted position of the first blind rivet 71 for the passenger to access to the rear seat. Then the seat is pushed backward, and the upper module 1 is restricted by the stationary lower module 2 at the memory position. After that, the pull tab 14 is released from the easy-entry module 5 and returns to the initial state.

The above are only preferred embodiments of the present invention and are not used to limit the scope of the present invention. Various changes can be made to the above-mentioned embodiments of the present invention. That is to say, all simple and equivalent changes and modifications made according to the claims of the present invention and the contents of the description fall into the protection scope of the patent of the present invention. What is not described in detail in the present invention is conventional technical content.

What is claimed is:

1. A memory module, comprising:
    an upper module including a fixed block, a pressure tongue and a reset spring, wherein the pressure tongue is rotatably mounted on the fixed block by the reset spring, wherein the reset spring provides a first driving force for the rotation of the pressure tongue, wherein the fixed block has a downwardly extending upper retaining point, and wherein the pressure tongue has an upper retaining surface formed by its front surface;
    a lower module engaged with the upper module and including a guide rail, a slider, a rotating block and a torsion spring, wherein the rotating block is rotatably mounted on the slider by the torsion spring, wherein the torsion spring provides a second driving force for the rotation of the rotating block, wherein the slider is slidably mounted on the guide rail, wherein the guide rail has locking holes, wherein the rotating block has a locking block, wherein the slider has an upwardly extending first lower retaining point at its front end, wherein the rotating block has an upwardly extending second lower retaining point at its rear end for engaging with the upper retaining point;
    when the front end of the rotating block is raised under action of the second driving force, the locking block is inserted into the locking hole, and the upper retaining surface is separated from the first lower retaining point; and
    when the rear end of the rotating block is raised since the rotating block is pressed by the pressure tongue under action of first driving force overcoming the second driving force, the locking block is separated from the locking hole, and the upper retaining surface is engaged with the first lower retaining point.

2. The memory module of claim 1, wherein the fixed block comprises a top plate portion and a bottom plate portion, wherein the bottom plate portion starts from a lower surface of the top plate portion and extends downward in an arc shape and then extends parallel to the top plate portion to form a fixed arcuate section and a straight section; wherein a rear end of the pressure tongue extends upward in an arc shape to form a tongue arcuate section; wherein the reset spring includes a first reed and a second reed; wherein the second reed starts from a rear end of the first reed and extends upward in an arc shape and then slopes upward to form a reed arcuate section and an inclined section; wherein the reed arcuate section is received in the tongue arcuate section, and the tongue arcuate section is received in the fixed arcuate section; wherein the inclined section is engaged with the top plate portion; and wherein the first reed provides the first driving force to the straight section of the pressure tongue.

3. The memory module of claim 2, wherein the fixed block further comprises a connecting rib, which extends perpendicular to the top plate portion and the bottom plate portion between the top plate portion and the bottom plate portion; wherein the pressure tongue includes side sections spaced apart by a tongue notch; wherein the reset spring includes side sections spaced apart by a reed notch; and wherein the connecting rib is inserted into and engaged with the tongue notch and the reed notch.

4. The memory module of claim 2, wherein the inclined section has a protrusion, wherein the top plate portion has a recess, and wherein the protrusion extends into and engaged with the recess.

5. The memory module of claim 2, wherein the pressure tongue comprises a first tongue portion, an inclined portion and a second tongue portion, wherein the inclined portion is between the first tongue portion and the second tongue portion parallel to each other and connects the first tongue portion to the second tongue portion.

6. The memory module of claim 5, characterized in that the upper module further comprises a pull tab mounted on the pressure tongue, wherein the pull tab has a curved section, wherein the inclined portion has a through hole, and wherein the curved section is inserted into and engaged with the through hole.

7. The memory module of claim 1, wherein the guide rail comprises a bottom wall and two side walls extending perpendicular to the bottom wall; wherein the slider is a rectangular frame structure and includes two longitudinal beams parallel to each other and two transverse beams perpendicular to the longitudinal beams and connecting the longitudinal beams; wherein half spheres are raised from both a bottom surface and an outer surface of the longitudinal beams; and wherein the half spheres are slidable on and engaged with the bottom wall and the side wall of the guide rail.

8. The memory module of claim 1, wherein the lower module further comprises a rotating shaft fixedly connected to the slider, wherein the torsion spring around the rotating shaft includes a first torsion arm, a second torsion arm and a connecting arm, wherein the connecting arm is disposed between the first torsion arm and the second torsion arm and connects the first torsion arm to the parallel second torsion arm; wherein the connecting arm is pressed on an upper surface of the rotating block, and wherein free ends of the first torsion arm and the second torsion arm away from the connecting arm are pressed on an upper surface of the slider to provide the second driving force to the rotating block.

9. The memory module of claim 1, further comprising:
a seat mounting structure with an easy-entry module, wherein the seat mounting structure includes the memory module.

10. A seat mounting structure with an easy-entry module, comprising:
a memory module, wherein the seat mounting structure includes the memory module; and
wherein the memory module comprises:
an upper module including a fixed block, a pressure tongue and a reset spring, wherein the pressure tongue is rotatably mounted on the fixed block by the reset spring, wherein the reset spring provides a first driving force for the rotation of the pressure tongue, wherein the fixed block has a downwardly extending upper retaining point, and wherein the pressure tongue has an upper retaining surface formed by its front surface;
a lower module engaged with the upper module and including a guide rail, a slider, a rotating block and a torsion spring, wherein the rotating block is rotatably mounted on the slider by the torsion spring, wherein the torsion spring provides a second driving force for the rotation of the rotating block, wherein the slider is slidably mounted on the guide rail, wherein the guide rail has locking holes, wherein the rotating block has a locking block, wherein the slider has an upwardly extending first lower retaining point at its front end, wherein the rotating block has an upwardly extending second lower retaining point at its rear end for engaging with the upper retaining point;
when the front end of the rotating block is raised under a action of the second driving force, the locking block is inserted into the locking hole, and the upper retaining surface is separated from the first lower retaining point; and
when the rear end of the rotating block is raised since the rotating block is pressed by the pressure tongue under a action of the first driving force overcoming the second driving force, the locking block is separated from the locking hole, and the upper retaining surface is engaged with the first lower retaining point.

11. The seat mounting structure of claim 10, characterized in that the seat mounting structure also includes a lower sliding rail, an upper sliding rail and the easy-entry module, wherein the upper module is connected to and inside the upper sliding rail, wherein the lower module is connected to and inside the lower sliding rail, wherein the upper sliding rail is connected to the lower sliding rail for allowing the upper sliding rail movable back and forth relative to the lower sliding rail, and wherein the easy-entry module is respectively connected to the upper module and the upper sliding rail.

12. The seat mounting structure of claim 10, wherein the guide rail of the lower module is connected to a lower sliding rail at two ends by a first blind rivet and a second blind rivet.

* * * * *